(12) United States Patent
Honda

(10) Patent No.: US 8,842,346 B2
(45) Date of Patent: Sep. 23, 2014

(54) DOCUMENT READING DEVICE WHICH INCLUDES AUTOMATIC DOCUMENT CONVEYING MECHANISM AND READS PLURAL DOCUMENTS ONE BY ONE

(75) Inventor: Takashi Honda, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 461 days.

(21) Appl. No.: 13/177,947

(22) Filed: Jul. 7, 2011

(65) Prior Publication Data

US 2012/0013957 A1    Jan. 19, 2012

(30) Foreign Application Priority Data

Jul. 13, 2010   (JP) ................................ 2010-158975

(51) Int. Cl.
  *H04N 1/04*    (2006.01)
  *H04N 1/00*    (2006.01)
  *H04N 1/23*    (2006.01)

(52) U.S. Cl.
  CPC ....... *H04N 1/00795* (2013.01); *H04N 1/00602* (2013.01); *H04N 1/00814* (2013.01); *H04N 2201/0094* (2013.01); *H04N 1/00777* (2013.01); *H04N 1/00689* (2013.01); *H04N 1/00588* (2013.01); *H04N 1/00615* (2013.01); *H04N 1/00705* (2013.01); *H04N 1/00745* (2013.01); *H04N 1/2346* (2013.01); *H04N 1/2307* (2013.01); *H04N 1/00551* (2013.01); *H04N 1/0062* (2013.01); *H04N 1/00572* (2013.01); *H04N 1/00591* (2013.01); *H04N 1/2376* (2013.01); *H04N 1/0058* (2013.01)
  USPC ............................ 358/496; 358/486; 358/498

(58) Field of Classification Search
  None
  See application file for complete search history.

(56) References Cited

U.S. PATENT DOCUMENTS 6,002,805 A    12/1999 Suzuki et al.

FOREIGN PATENT DOCUMENTS

| JP | 05-170356 A | | 7/1993 |
|---|---|---|---|
| JP | 05170356 A | * | 7/1993 |
| JP | 7-307844 A | | 11/1995 |
| JP | 9 200448 A | | 7/1997 |
| JP | 09-200448 A | | 7/1997 |
| JP | 09200448 A | * | 7/1997 |
| JP | 2003-344957 A | | 12/2003 |

OTHER PUBLICATIONS

Office Action (Notice of Grounds of Rejection) dated May 22, 2012, issued in corresponding Japanese Patent Application No. 2010-158975, and an English Translation thereof. (20 pages).

* cited by examiner

*Primary Examiner* — Cheukfan Lee
(74) *Attorney, Agent, or Firm* — Buchanan Ingersoll & Rooney

(57) ABSTRACT

A digital multi function peripheral includes a scanner for reading an image in a document read position; a document retaining cover for being able to change an opening and closing state between a state in which the scanner is closed and a state in which the scanner is opened, and conveying a document to the scanner when the scanner is closed; a registration sensor for detecting a leading end portion and a rear end portion of the document conveyed by the document retaining cover; and a controller for determining the opening and closing state of the document retaining cover based on a state of the leading end portion and the rear end portion of the document in the image read by an IR module at a time when a predetermined time frame elapses since a detection state of the registration sensor changes. Therefore, the opening and closing state of the conveyance unit for conveying the document can accurately be detected.

24 Claims, 8 Drawing Sheets

290a
P1
R1
R2

MAIN SCANNING DIRECTION

SUB-SCANNING DIRECTION
(a)                    (b)

DOCUMENT READING DEVICE WHICH INCLUDES AUTOMATIC DOCUMENT CONVEYING MECHANISM AND READS PLURAL DOCUMENTS ONE BY ONE

This application is based on Japanese Patent Application No. 2010-158975 filed with the Japan Patent Office on Jul. 13, 2010, the entire content of which is hereby incorporated by reference.

BACKGROUND OF THE INVENTION

1. Field of the Invention

The present invention relates to an document reading device, more particularly to an document reading device which includes an automatic document conveying mechanism and reads plural documents one by one.

2. Description of the Background Art

An image forming apparatus such as an MFP (Multi function Peripheral), a facsimile machine, and a copying machine or a scanner apparatus includes an automatic document conveying mechanism such as an ADF (Auto Document Feeder). In the scanner apparatus (or automatic document conveying and reading mechanism) provided with the ADF, when plural documents are initially set on the ADF, document images can automatically be read by the scanner while the documents run one by one. In the scanner apparatus provided with the ADF, the ADF is incorporated in a document retaining cover that is openable in an upper portion of the scanner.

In reading images of the documents set in the ADF using the scanner, the document retaining cover is maintained in a closed state (retains the document) when the document passes by a read position of the scanner, and the document is brought into close contact with an imaging element, such as a CCD (Charge Coupled Device) and a CIS (Contact Image Sensor), which is located on a scanner side (flat bed side). Accordingly, when a user mistakenly opens the document retaining cover while the ADF conveys the document, the document departs from the imaging element, and the image cannot normally be read.

At this point, when the scanner includes a document retaining cover opening and closing sensor to always sense an opening and closing state of the document retaining cover, the document retaining cover opening and closing sensor can sense that the document retaining cover is opened even if the ADF currently conveys the document. Once the document retaining cover opening and closing sensor senses that the document retaining cover is opened, the document conveyance is immediately stopped to perform error handling.

However, in an inexpensive scanner that cuts cost, sometimes the scanner does not include the document retaining cover opening and closing sensor for the purpose of apparatus simplification and cost reduction. In such scanners, the opening and closing state of the document retaining cover cannot be detected while the ADF conveys the document, which results in a problem in that an abnormal read image is output.

In order to avoid the problem, for example, Documents 1 and 2 below propose a technology of determining the opening and closing state of the document retaining cover by analyzing image information obtained from an image sensor in a standby state of the scanner.

In the technology disclosed in Document 1 below, a white seal (white reference plate) is provided in a surface (a reverse side of the document retaining cover) on the document read side of a transmission frame, a signal level (white level) of light reflected from the white seal is obtained while shading correction is performed at the beginning of the image read, and the opening and closing state of the transmission frame is determined by comparing the signal level to a reference level.

Document 2 discloses the technology of detecting the opening and closing state of a cover of a document conveyance unit. Specifically, image detection information from the image sensor that detects an image based on the light reflected from the document is converted into binary information, the binary information is used as image read information in reading the image, and is used as information detecting the opening and closing state of the cover of the document conveyance unit at other times.

In a technology disclosed in Document 3, a detection plate in which two black lines are marked at a proper interval is attached to the backside of a document cover (document retaining cover), the marks are read by the CCD to sense the document retaining cover of the document cover immediately before the document is conveyed to the read position of the CCD, and conveyance means is stopped when the CCD senses that the document cover is in the opened state.

[Document 1] Japanese Patent Application Laid-Open No. 7-307844

[Document 2] Japanese Patent Application Laid-Open No. 9-200448

[Document 3] Japanese Patent Application Laid-Open No. 2003-344957

However, in the technologies of Documents 1-3, the opening and closing state of the document retaining cover or the like is determined before or after the image is read. Therefore, the opening and closing state cannot be detected when the user opens the document retaining cover while the image is read, which results in a problem in that an abnormality is generated in the scanned image.

Additionally, in the technology of Document 3, it is necessary to provide a dedicated member (detection plate) in order to detect the opening and closing state of the document cover, which possibly causes complicated apparatus and cost increase. Because the marks on the detection plate are provided in positions where the marks come into contact with other members, degradation and damage are generated with long-term use (permanent use), which possibly results in a problem in that detection accuracy of the opening and closing state is lowered.

SUMMARY OF THE INVENTION

An object of the invention is to provide a document reading device that can accurately detect the opening and closing state of the conveyance unit for conveying the document, an image forming apparatus, a document reading device controlling method, and a non-transitory computer readable medium storing a control program for a document reading device.

According to an aspect of the invention, a document reading device includes: a reader for reading an image in a read position; a conveyance unit for being able to change an opening and closing state between a state in which the reader is closed and a state in which the reader is opened, and conveying a document to the read position when the reader is closed; a detector for detecting an end portion of the document that is conveyed by the conveyance unit and extended in a direction perpendicular to a conveyance direction; and a determination unit for determining the opening and closing state of the conveyance unit based on a state of the end portion of the document in the image read by the reader at a time when a predetermined time frame elapses since a detection state of the detector changes.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, an embodiment of the invention will be described with reference to the drawings. In the embodiment, a digital multi function peripheral (MFP) is described as the image forming apparatus by way of example.

[Outline of MFP]

Figure 1:
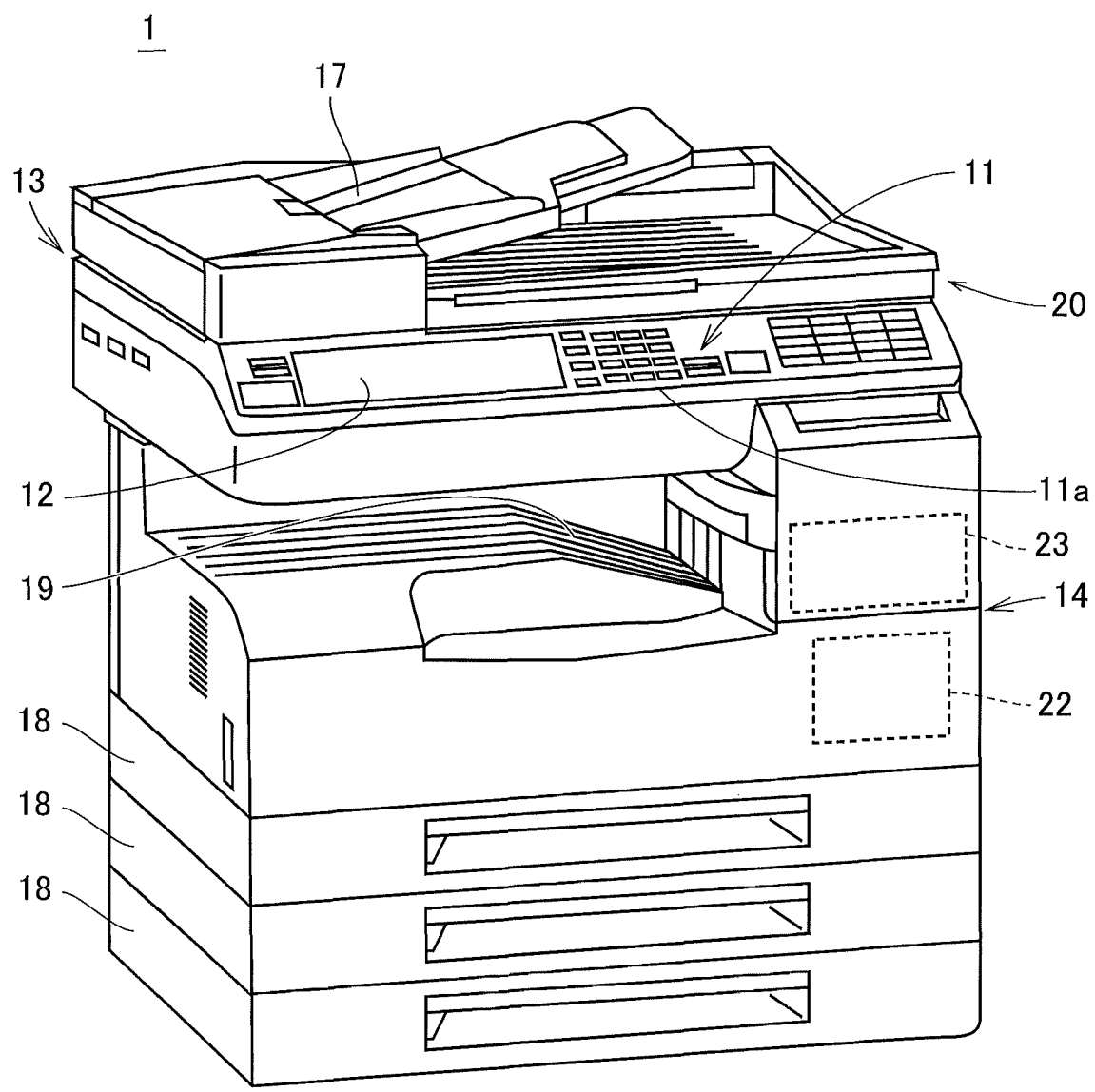
FIG. 1 is an appearance diagram illustrating a digital multi function peripheral according to an embodiment of the invention.

Referring to FIG. 1, a digital multi function peripheral 1 has a copy function, a scanner function, a printer function, and a facsimile function, and digital multi function peripheral 1 can transmit and receive data through a network. Digital multi function peripheral 1 includes an operation unit 11, a display 12, a scanner 13 (example of the reader), a printer 14, an ADF 17, a sheet feeder 18, a tray 19, a document retaining cover 20 (example of the conveyance unit), a communication unit 22, and a storage 23.

Operation unit 11 includes plural keys 11a and receives inputs of various instructions and pieces of data such as characters and numeric characters in response to user's operation of the keys. Display 12 displays an instruction menu for the user and information relating to an obtained image.

Scanner 13 reads pieces of image information such as a photograph, characters, and a picture from a document in an optoelectrical manner to obtain image data. The obtained image data (density data) is converted into digital data by an image processor (not illustrated), and well-known various kinds of image processing are performed to the digital data. Then the digital data is transmitted to printer 14 or communication unit 22 and used in image print or data transmission, or the digital data is stored in storage 23 for future use.

Printer 14 forms (prints) the image on a recording sheet based on the image data obtained from scanner 13, the image data received from an external device by communication unit 22, or the image data stored in storage 23.

ADF 17 is provided in an upper portion of a main body of digital multi function peripheral 1 to feed automatically the document to scanner 13, and sheet feeder 18 is provided in a lower portion of the main body of digital multi function peripheral 1 to supply the recording sheet to printer 14. For example, sheet feeder 18 is divided into three steps, and recording sheets having different sizes are stored in sheet feeders 18, respectively. Tray 19 is provided in a central portion of digital multi function peripheral 1, and the recording sheet in which the image is printed by printer 14 is discharged to tray 19.

ADF 17 is incorporated in document retaining cover 20. Document retaining cover 20 can change an opening and closing state between a state in which scanner 13 is closed and a state in which scanner 13 is opened, and includes opening and closing mechanisms such as a hinge. ADF 17 and document retaining cover 20 are described in detail later.

Communication unit 22 and storage 23 are provided in digital multi function peripheral 1. Communication unit 22 transmits and receives the image data to and from an external device through a network, and the image data is stored in storage 23. Although not illustrated, digital multi function peripheral 1 includes a network interface, communication unit 22 is connected to the network through the network interface so as to be able to transmit and receive various pieces of data with the external device.

In addition to facsimile data transmission and reception through a public telephone line, communication unit 22 transmits and receives data with the external device connected to networks such as LAN (Local Area Network) and the Internet using an e-mail through the network.

Figure 2:
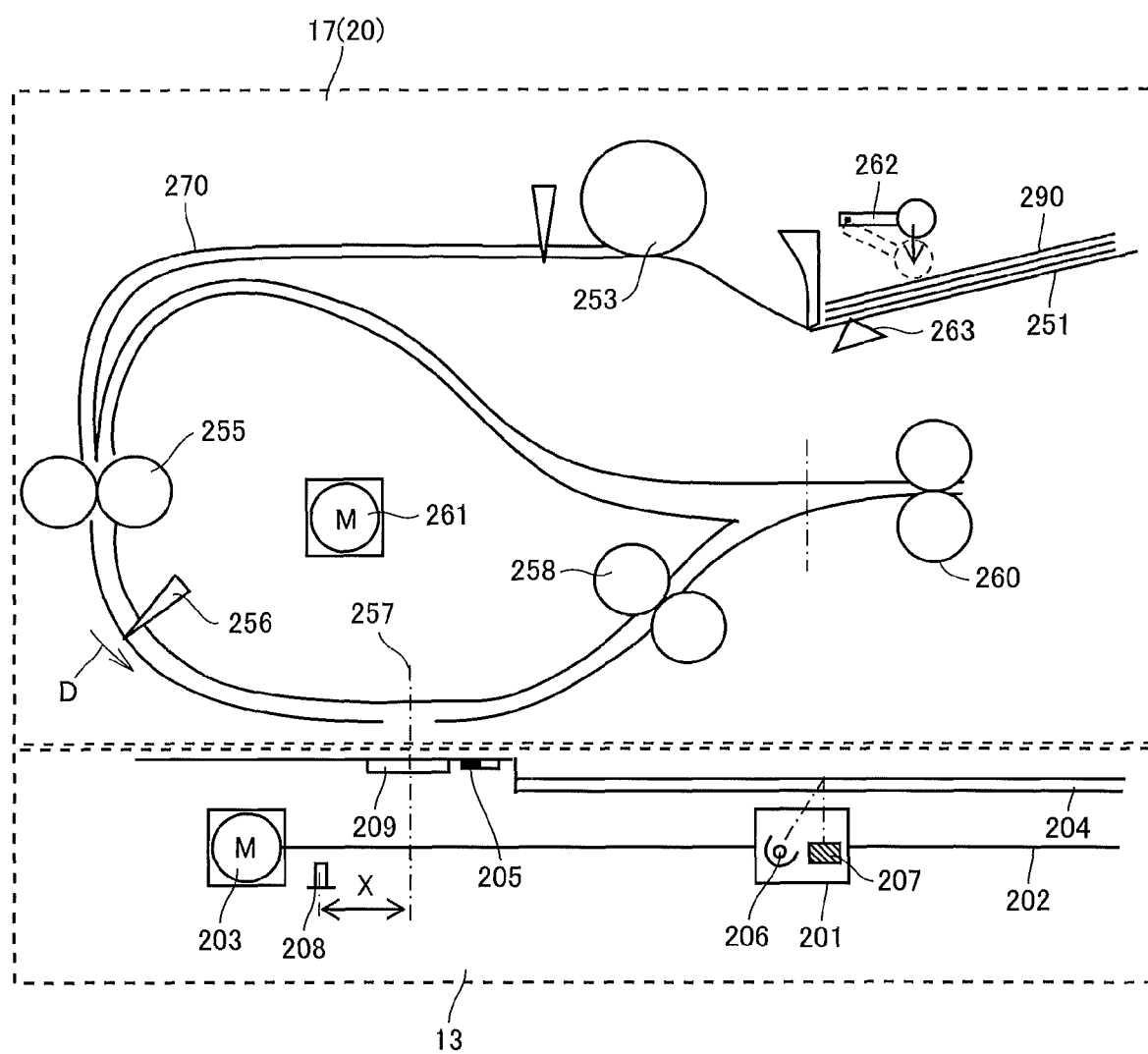
FIG. 2 is a sectional view illustrating an outline of a configuration of an image reader in the digital multi function peripheral of the embodiment.

FIG. 2 is a sectional view illustrating an outline of a configuration of an image reader in the digital multi function peripheral of the embodiment, Referring to FIG. 2, the image reader includes scanner 13 (IR (Image Reader)) and document retaining cover 20 that is provided above scanner 13 to incorporate ADF 17 therein. The image reader can read the image of the document placed on a document surface glass 204 of scanner 13 (the document sandwiched between document surface glass 204 and ADF 17). At this point, document retaining cover 20 is opened (departs from scanner 13) to place the document on exposed document surface glass 204 (document retaining cover 20 is closed in reading the document image). The image reader can continuously read the documents delivered from a document tray 251 of ADF 17 to a document read position (ADF document read surface) 257. When the documents are continuously read by ADF 17, document retaining cover 20 is closed (scanner 13 is covered with document retaining cover 20) to place the documents on document tray 251.

Scanner 13 includes an IR module 201, a drive transmission unit 202, an IR motor 203, document surface glass 204, a shading plate 205, a home position sensor 208, and a document read surface glass (ADF read surface glass) 209.

IR module 201 can move (scan) in a lateral direction of FIG. 2 along document surface glass 204 by IR motor 203 and drive transmission unit 202 such as a belt and a wire. IR module 201 includes a lamp 206 that irradiates the document with light and an image sensor 207 that receives the light reflected from the document. Lamp 206 scans the document placed on document surface glass 204, and image sensor 207 receives the light reflected from the document. Therefore, IR module 201 reads the document image to obtain the image data.

Shading plate 205 is used to obtain a reference white output, and is disposed in a position where IR module 201 can read shading plate 205. In reading the document, IR module 201 moves to the position below shading plate 205 to obtain the image data of shading plate 205. As a result, a pixel variation of image sensor 207 is corrected based on the image data obtained from shading plate 205. Home position sensor 208 is disposed in a predetermined position in scanner 13. Home position sensor 208 is used as a reference position for positioning IR module 201.

ADF 17 conveys a document 290 placed on document tray 251 to document read position 257 along a conveyance path 270 when document retaining cover 20 is closed. ADF 17 includes document tray 251, a sheet feed roller 253, a conveyance roller 255, a registration sensor 256 (example of the detector), discharge rollers 258 and 260, an ADF motor 261, a pickup roller 262, and a document sensor 263.

Sheet feed roller 253, conveyance roller 255, registration sensor 256, and discharge rollers 258 and 260 are provided along conveyance path 270. Sheet feed roller 253 conveys document 290 to conveyance roller 255 along conveyance path 270, and conveyance roller 255 conveys document 290 to document read position 257 along conveyance path 270. Discharge rollers 258 and 260 discharge document 290 from document read position 257 to a tray outside the apparatus. ADF motor 261 drives each roller.

Pickup roller 262 and document sensor 263 are provided near document tray 251. Pickup roller 262 carries document 290 on document tray 251 in a conveyance path (in an ADF machine) one by one. Document sensor 263 determines whether document 290 exists on document tray 251.

Registration sensor 256 is provided between conveyance roller 255 and document read position 257, and is provided on an upstream side of document read position 257 in a conveyance direction D. Registration sensor 256 detects an end portion (document end portion edge) of document 290 in a sub-scanning direction (a direction perpendicular to the conveyance direction D) of IR module 201.

Figure 3:
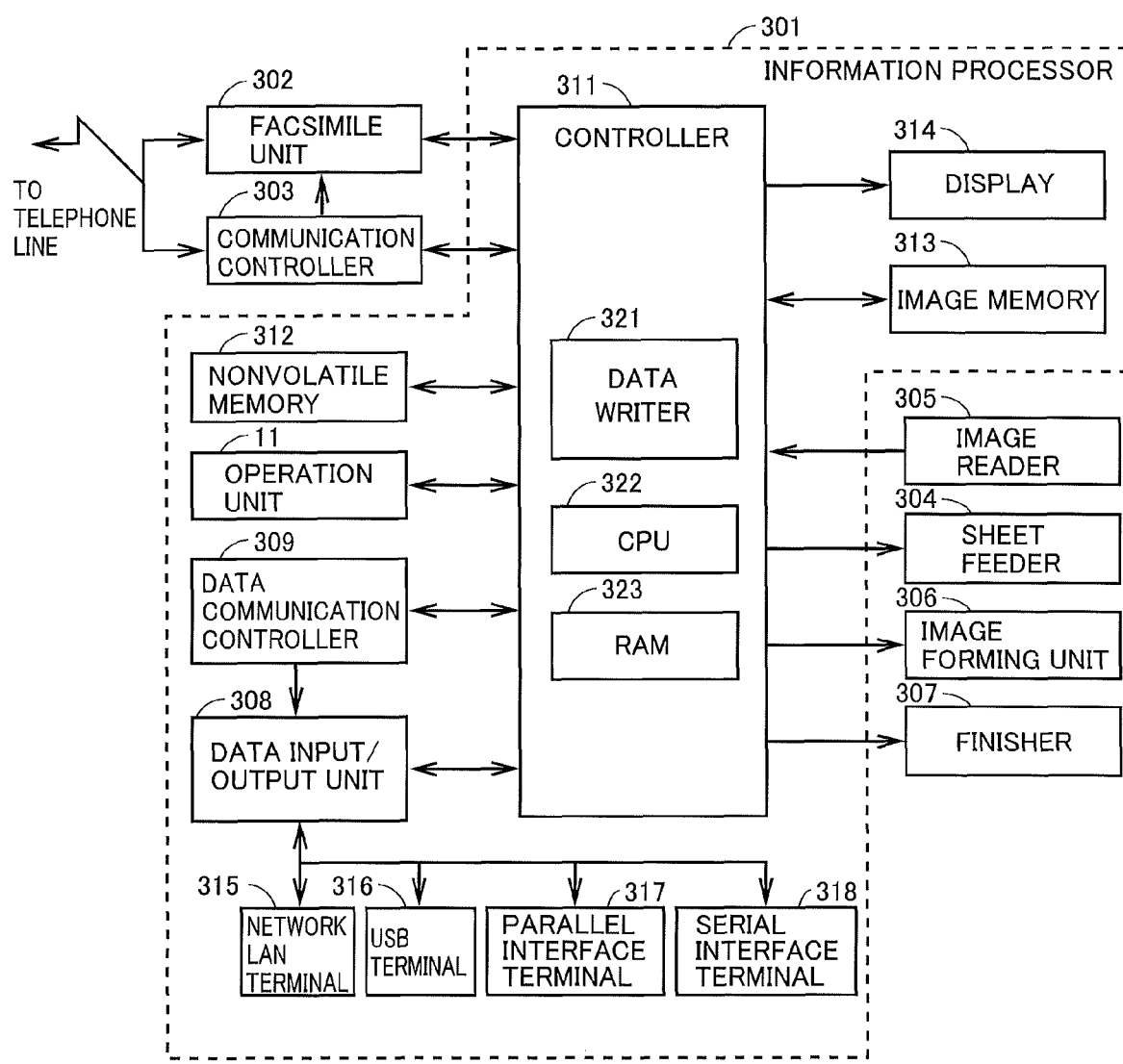
FIG. 3 is a block diagram illustrating an internal configuration of the digital multi function peripheral of the embodiment.

FIG. 3 is a block diagram illustrating an internal configuration of the digital multi function peripheral of the embodiment.

Referring to FIG. 3, digital multi function peripheral 1 includes an information processor 301, a facsimile unit 302, a communication controller 303, a sheet feeder 304, an image reader 305, an image forming unit 306, and a finisher 307.

Information processor 301 includes a data input/output unit 308, a data communication controller 309, an operation unit 11, a controller 311, a nonvolatile memory 312, an image memory 313, and a display 314. Information processor 301 controls deletion and output of a job stored in the controls image memory 313. Information processor 301 receives an instruction to perform the job from the user through operation unit 11. Information processor 301 gives a warning that the document retaining cover is opened to the user through display 314. Display 314 corresponds to display 12 of FIG. 1.

Controller 311 includes a data writer 321, a CPU 322, and a RAM 323. Controller 311 controls the whole of digital multi function peripheral 1 such as a printing operation, a copying operation, a scanning operation, a facsimile transmission operation, a mail transmission operation, and an FTP (File Transfer Protocol) transmission operation according to various processing programs stored in nonvolatile memory 312.

Data input/output unit 308 is connected to controller 311 and used in inputting and outputting the job. Plural interface terminals such as a TCP/IP-based network LAN terminal 315, a USB terminal 316, a parallel interface terminal 317, and a serial interface terminal 318 are provided in data input/output unit 308. In data input/output unit 308, when the external device is connected to network LAN terminal 315, USB terminal 316, parallel interface terminal 317, or serial interface terminal 318, controller 311 can read, write, and delete the data of the external device.

For example, nonvolatile memory 312 is a hard disk in which the image data is stored.

Image reader 305 corresponds to the configuration of FIG. 2. When the document is read, controller 311 issues an instruction to operate a driving system to image reader 305. In response to the instruction from controller 311, image reader 305 reads the document image that becomes a target and transfers the obtained image data to data writer 321 of controller 311.

Controller 311 performs various pieces of processing using the image data obtained by image reader 305. According to contents of the job received from the user, controller 311 externally transmits the image data obtained by image reader 305 using facsimile 302, forms the image (copies) in the sheet using image forming unit 306 corresponding to printer 14 of FIG. 1, or stores the image data in nonvolatile memory 312.

[Method for Detecting Opening and Closing State of Document Retaining Cover]

Figure 4:
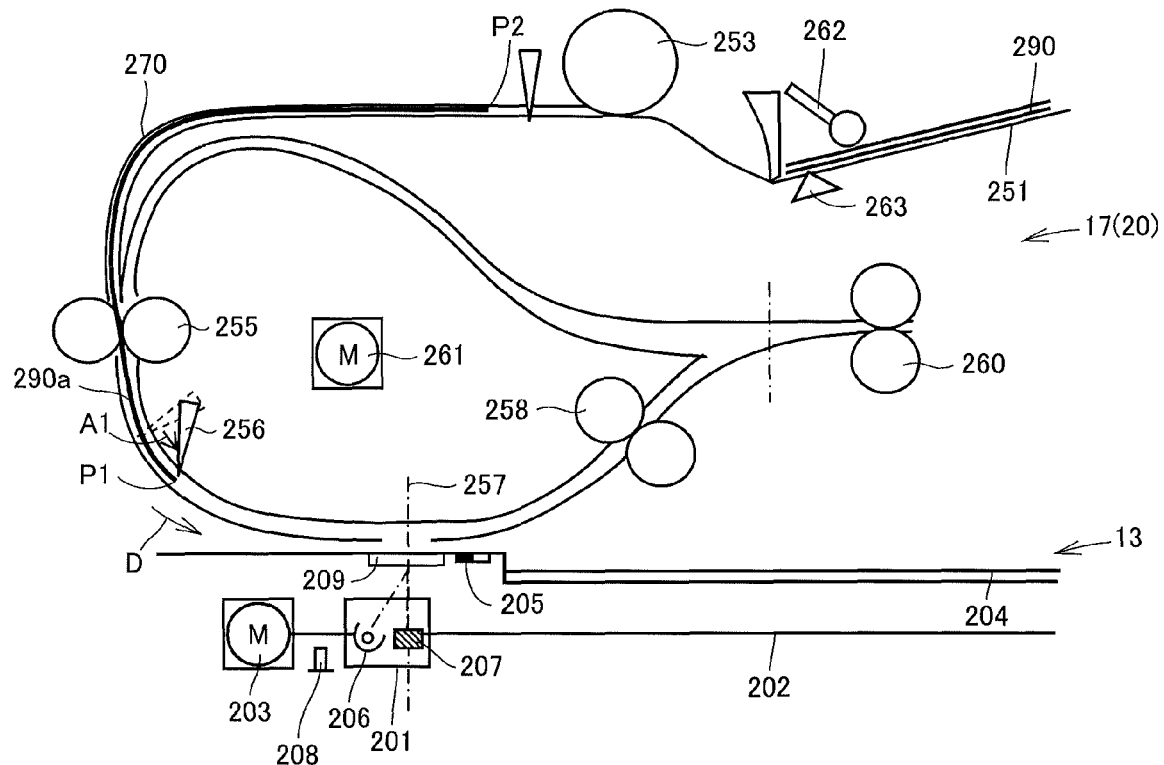
FIG. 4 is a sectional view illustrating a first state of a document conveyed in the digital multi function peripheral of the embodiment.
Figure 5:
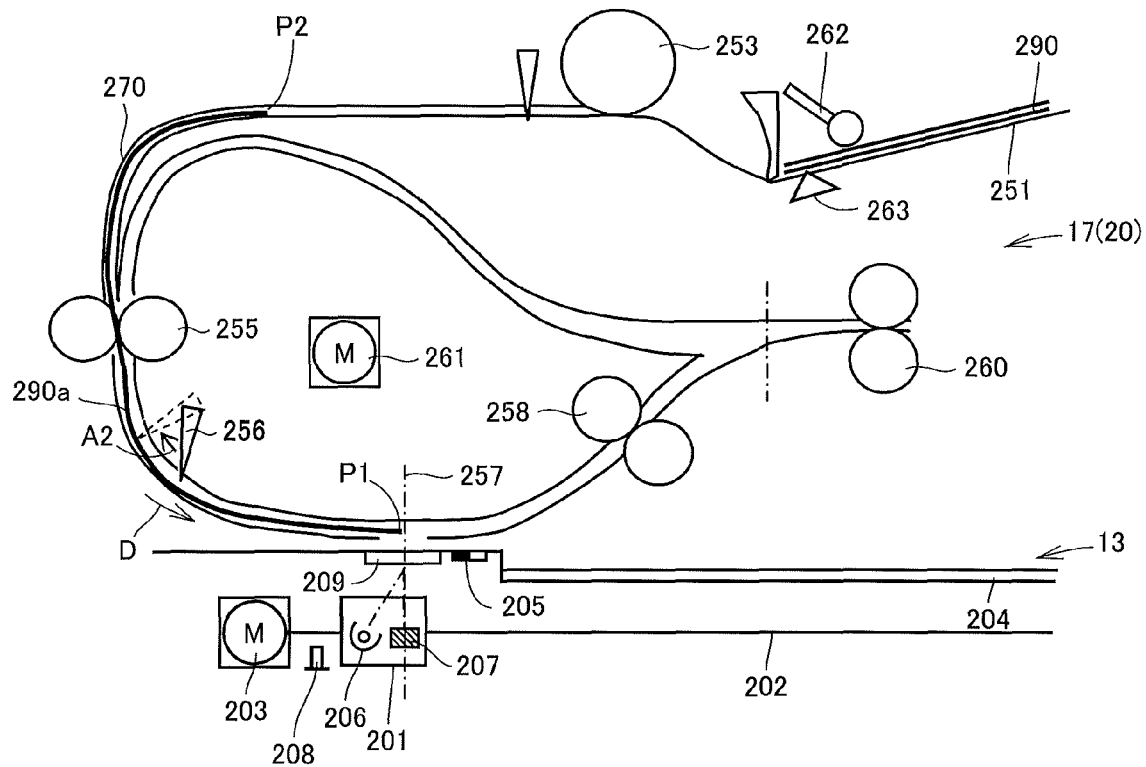
FIG. 5 is a sectional view illustrating a second state of the document conveyed in the digital multi function peripheral of the embodiment.

With reference to FIGS. 4 and 5, a method for detecting the opening and closing state of the document retaining cover of the embodiment will be described below. FIGS. 4 and 5 illustrate the state in which the document retaining cover is closed.

Referring to FIG. 4, IR module 201 is moved immediately below document read position 257 when digital multi function peripheral 1 receives the instruction to perform jobs such as the copy, the facsimile transmission, and the scanning from the user. At this point, a distance X (FIG. 2) between document read position 257 and home position sensor 208 is fixed from a design standpoint. Accordingly, after IR module 201 is tentatively moved to the left of FIG. 4 to the position of home position sensor 208, IR module 201 is moved to the right of FIG. 4 and stopped in the position away from home position sensor 208 by the distance X, which allows IR module 201 to be accurately disposed immediately below document read position 257.

Then document sensor 263 determines whether document 290 is placed on document tray 251. ADF 17 conveys the document only when document sensor 263 determines that document 290 is placed on document tray 251 in performing the scanning job. ADF motor 261 is driven when document 290 is placed on document tray 251. A driving force of ADF motor 261 is transmitted to each roller by a driving transmission system (not illustrated) such as a gear, thereby driving each roller. When each roller is driven, pickup roller 262 that is not in contact with document 290 is lowered to come into contact with an upper surface of document 290, thereby conveying a document 290a located in the uppermost portion of plural documents 290 on document tray 251 into ADF 17 (into ADF machine). For example, the operation of pickup roller 262 is switched by an electromagnetic clutch (not illustrated). Document 290a conveyed to conveyance path 270 by pickup roller 262 is conveyed to document read position 257 along conveyance path 270 by sheet feed roller 253 and conveyance roller 255.

On the other hand, when document sensor 263 determines that document 290 is not placed on document tray 251, a sensor (not illustrated) may confirm whether the document is placed on document surface glass 204. When the document is placed on document surface glass 204, IR module 201 is moved from immediately below document read position 257 to the right of FIG. 4, whereby the image of the document placed on document surface glass 204 may be read.

When a leading end portion (an end portion on the downstream side in the conveyance direction D in two end portions in the sub-scanning direction of IR module 201) P1 of conveyed document 290a reaches registration sensor 256, registration sensor 256 comes into contact with document 290a to move in a direction indicated by an arrow A1 of FIG. 4, and an output signal of registration sensor 256 changes from an off-state (document undetected state) to an on-state (document detected state), thereby detecting leading end portion P1 of document 290a.

Referring to FIG. 5, image sensor 207 of IR module 201 reads the image in document read position 257 when a time frame Tx elapses since the output signal of registration sensor 256 changes from the off-state to the on-state. Time frame Tx is set in agreement with timing in which leading end portion P1 of document 290a passes through document read position 257. When document retaining cover 20 is closed (normal conveyance case), document 290a is brought close to image sensor 207 in document read position 257, the in-focus image data on document 290a or in-focus contour data of document 290a is input to image sensor 207. When the image of leading end portion P1 of document 290a can normally be read, the determination that document retaining cover 20 is in the "closed" state (normal state) is made to continue the operation to read the image of document 290a.

When a rear end portion (an end portion on the upstream side in conveyance direction D in the two end portions in the sub-scanning direction of IR module 201) P2 of conveyed document 290a reaches registration sensor 256, registration sensor 256 is not in contact with document 290a, registration sensor 256 moves in a direction indicated by an arrow A2 of FIG. 5, and the output signal of registration sensor 256 changes from the on-state to the off-state, thereby detecting rear end portion P2 of document 290a. Image sensor 207 of IR module 201 reads the image in document read position 257 when a time frame Ty elapses since the output signal of registration sensor 256 changes from the on-state to the off-state. Time frame Ty is set in agreement with timing in which rear end portion P2 of document 290a passes through document read position 257. Time frame Ty may be equal to or different from time frame Tx. Time frame Ty and time frame Tx are previously stored in controller 311. When the image of rear end portion P2 of document 290a can normally be read, the determination that document retaining cover 20 is in the "closed" state is made to continue the operation to read the image of document 290a.

After passing through document read position 257, document 290a is conveyed by discharge roller 258 or discharge roller 260 and discharged from ADF 17 (ADF machine).

Figure 6:
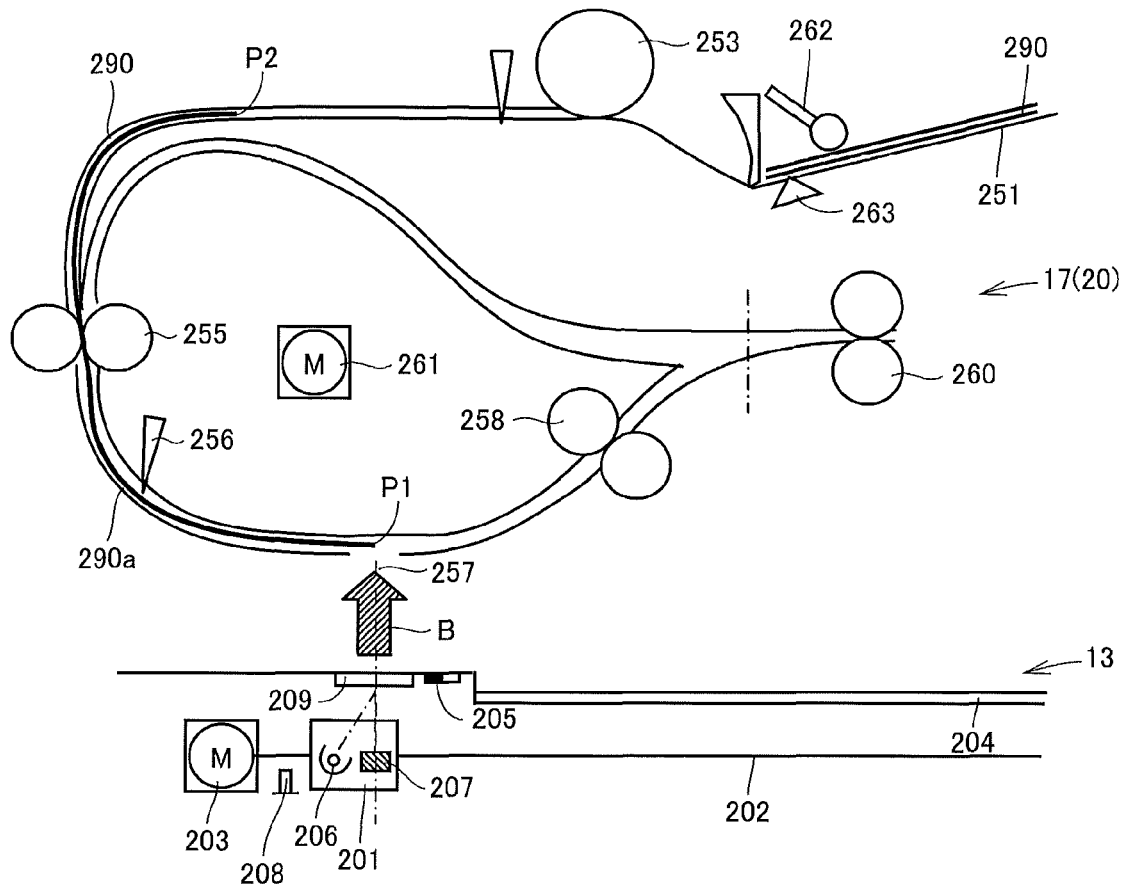
FIG. 6 is a sectional view illustrating a state in which a document retaining cover is opened in the digital multi function peripheral of the embodiment.

FIG. 6 is a sectional view illustrating the state in which the document retaining cover is opened in the digital multi function peripheral of the embodiment.

Referring to FIG. 6, when document retaining cover 20 is opened as indicated by an arrow B of FIG. 6 while ADF 17 conveys document 290a, the document surface of document 290a departs from image sensor 207. Therefore, the defocused image data or abnormal image data close to the solid black of the outside light is input to image sensor 207. The determination that document retaining cover 20 is in the "opened" state (abnormal state) is made when the image of leading end portion P1 or rear end portion P2 of the document cannot normally be read. At this point, the operation to read the image of document 290a and the operation to convey the document are immediately stopped to give a warning that the document retaining cover is opened through display 314 (FIG. 3). When the received job is the copy, print output processing is stopped in order to prevent a waste of sheets. When the received job is the facsimile transmission, the transmission processing may be stopped. When the received job is the scanning processing, the storage of the image data may be stopped.

Figure 7:
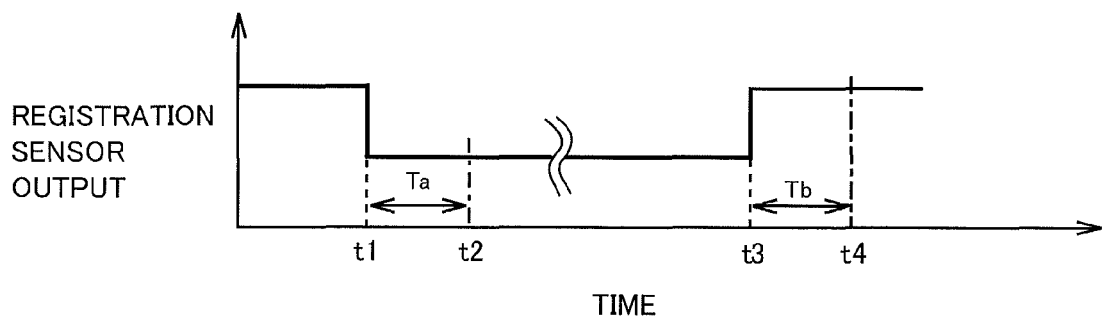
FIG. 7 is a view illustrating timing in which an end portion of the document is read.

FIG. 7 is a view illustrating timing in which the end portion of the document is read.

Referring to FIG. 7, it is assumed that a time t1 is a time (timing) the output signal of registration sensor 256 changes from the off-state to the on-state. A distance along conveyance path 270 to document read position 257 from the position where registration sensor 256 is disposed is previously fixed from the design standpoint, and a document conveyance speed is also previously fixed from the design standpoint. Accordingly, a time frame Ta from time t1 to a time t2 leading end portion P1 of document 290a reaches document read position 257 can be computed based on the two values. As a result, image sensor 207 starts the image capturing at time t2 time after frame Ta elapses from time t1, which allows image sensor 207 to obtain the image data of leading end portion P1 of conveyed document 290a (at this point, time frame Tx=time frame Ta). The time frame Ta (document leading end timing data) may previously be stored in controller 311.

Similarly it is assumed that a time t3 is a time (timing) the output signal of registration sensor 256 changes from the on-state to the off-state. A time frame Tb from time t3 to a time t4 where rear end portion P2 of document 290a reaches document read position 257 can be computed based on the two values. As a result, image sensor 207 captures the image data of the rear end portion P2 at time t4 after time frame Tb elapses from time t3, which allows image sensor 207 to obtain the image data of rear end portion P2 of conveyed document 290a (at this point, time frame Ty=time frame Tb). Time frame Tb (document rear end timing data) may previously be stored in controller 311.

As described above, the timing in which the end portion of document 290a reaches document read position 257 can be determined based on the output signal change of registration sensor 256 and time frame Ta or time frame Tb. Accordingly, there is no possibility of mistakenly detecting a point, at which a large density difference is generated in the document area of the read document image, as the end portion.

Preferably time frame Ta and time frame Tb are separately be set because sometimes time frame Ta and time frame Tb differ from each other by the configuration of ADF 17.

Desirably time frame Tx until image sensor 207 starts the image capturing since the output signal of registration sensor 256 changes from the off-state to the on-state is shorter than time frame Ta until leading end portion P1 of document 290a reaches document read position 257 since the output signal of registration sensor 256 changes from the off-state to the on-state by a slight amount □ (that is, Tx=Ta-a and Tx<Ta). Similarly, desirably time frame Ty until image sensor 207 captures the image data of the rear end portion P2, since the output signal of registration sensor 256 changes from the on-state to the off-state is shorter than time frame Tb until rear end portion P2 of document 290a reaches document read position 257 since the output signal of registration sensor 256 changes from the on-state to the off-state by the slight amount a (that is, Ty=Tb-a and Ty<Tb). This is because, when the end portion of document 290a is detected based on the image data, it is necessary to use the pieces of image data of plural lines along the sub-scanning direction.

Figure 8:
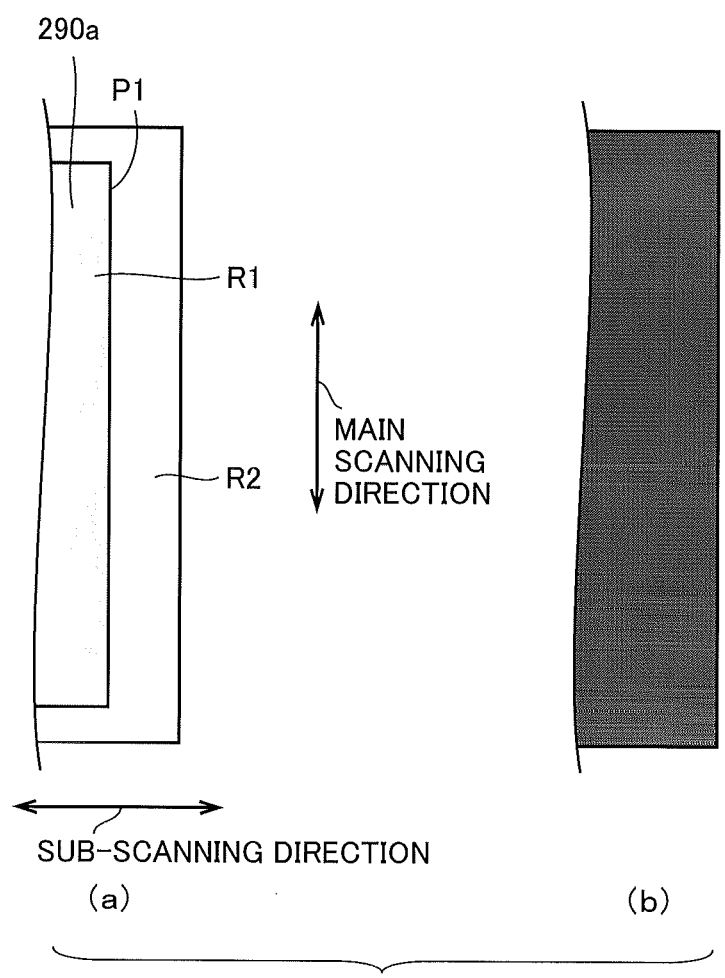
FIG. 8 is a view schematically illustrating an image read by an image sensor.

FIG. 8 is a view schematically illustrating the image read by the image sensor. FIG. 8(a) illustrates the image in the state in which the document retaining cover is closed, and FIG. 8(b) illustrates the image in the state in which the document retaining cover is opened.

Referring to FIG. 8, a boundary line between a document area R1 (portion in which document 290a exists) and a non-document area R2 (a background of document 290a) is clear when the document retaining cover is in the closed state (FIG. 8(a)). Therefore, the image of leading end portion P1 (or rear end portion P2) of document 290a can normally be read (captured). On the other hand, when the document retaining cover is in the opened state (FIG. 8(b)), because the reflected light is not received by image sensor 207 (or because of a small amount of reflected light quantity), the wholly dark image is obtained, and the image of leading end portion P1 (or rear end portion P2) of document 290a cannot normally be read. Accordingly, the opening and closing state of document retaining cover 20 can be detected based on whether the image of the end portion of document 290a can be read (obtained).

For example, leading end portion P1 and rear end portion P2 of the document can be detected by the following method. However, well-known methods can be used in addition to the following method. At first, in the image data of the obtained document, a pixel value at a certain pixel position in the main scanning direction is checked along the sub-scanning direction to perform binarization processing whether the checked pixel value exceeds a predetermined threshold. A position that becomes a boundary by the binarization processing is stored in nonvolatile memory 312 (FIG. 3) as a sub-scanning line position (a position along the sub-scanning direction) of the boundary between document area R1 and non-document area R2. Then whether the stored sub-scanning line position of the boundary between document area R1 and non-document area R2 is continued longer than a predetermined length along the main scanning direction is checked. When the stored sub-scanning line position is continued longer than a predetermined length, the sub-scanning line position is determined to be the end portion of the document.

[Flowchart of Document Image Read Processing]

A flowchart of document image read processing performed by controller 311 will be described below.

Figure 9:
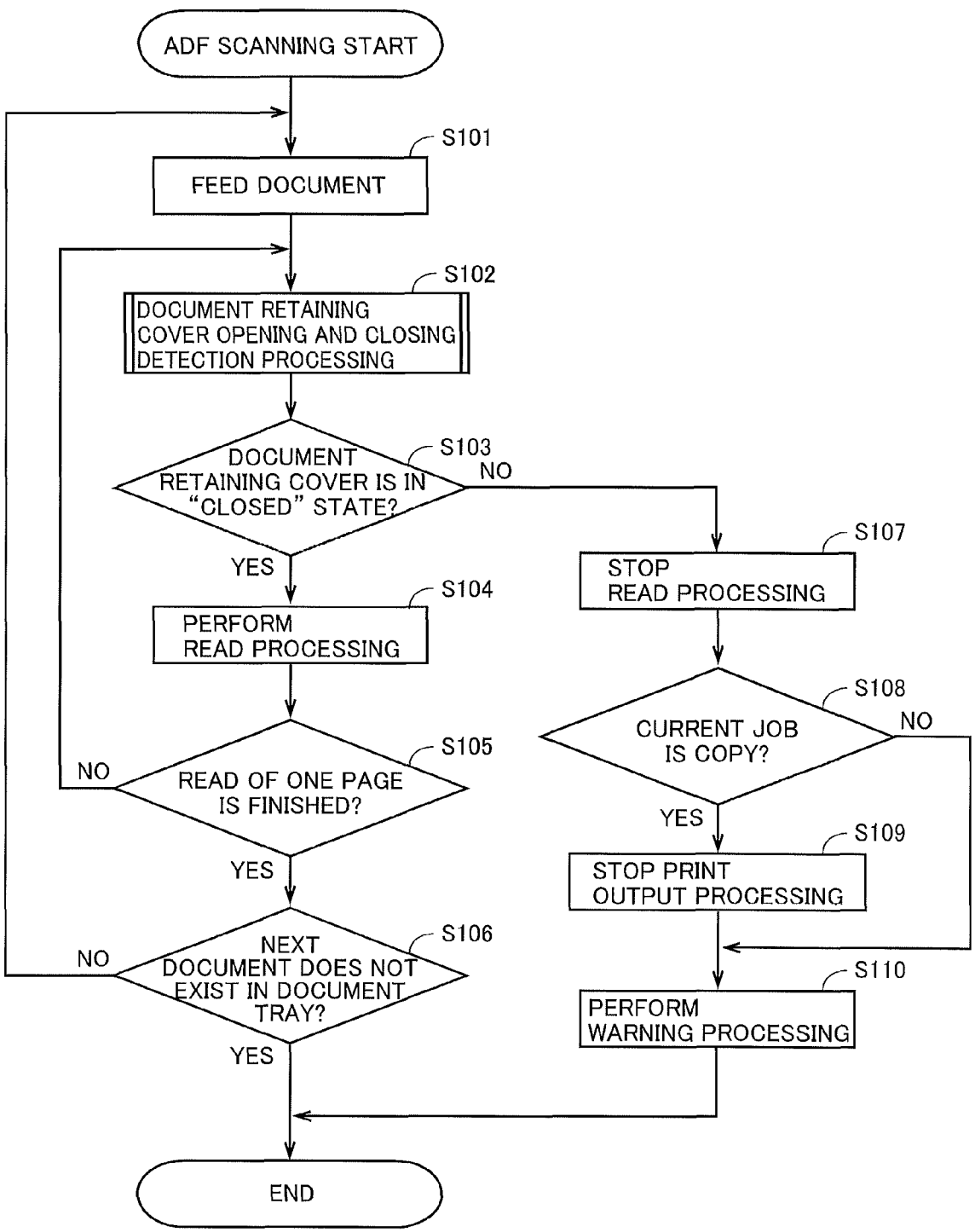
FIG. 9 is a view illustrating a main routine for document image read processing of the embodiment.

FIG. 9 is a view illustrating a main routine for document image read processing of the embodiment.

Referring to FIG. 9, when the instruction to perform the job relating to the document image read is received from the user, controller 311 feeds document 290a (S101). That is, controller 311 starts ADF motor 261 to lower pickup roller 262, thereby conveying document 290a to conveyance path 270 (to ADF machine). Then controller 311 performs a document retaining cover opening and closing detection processing to detect the opening and closing state of document retaining cover 20 (S102).

Controller 311 determines whether document retaining cover 20 is in the closed state (S103). When document retaining cover 20 is in the closed state (YES in S103), controller 311 determines that document retaining cover 20 is in the normal state and performs (continue) processing of reading the image of document 290a (S104). Then controller 311 determines whether the read of one page is finished (S105). When the read of one page is not finished (NO in S105), controller 311 continuously performs the document retaining cover opening and closing detection processing again in order to detect the image of the rear end portion of document 290a (S102). When the read of one page is finished (YES in S105), controller 311 determines whether next document 290 is placed on document tray 251 (S106). When next document 290 is placed on document tray 251 (NO in S106), controller 311 goes to step S101 in order to feed the next document. When next document 290 is not placed on document tray 251 (YES in S106), controller 311 ends the image read processing.

In step S103, when document retaining cover 20 is in the opened state (NO in S103), document retaining cover 20 is in the abnormal state. In this case, controller 311 immediately stops (halts) the document image read processing and the operation to convey document 290a (S107). Then controller 311 determines whether the current job received from the user is the copy (S108). When the current job is the copy (YES in S108), controller 311 stops (halts) the print output processing in order to prevent the printing of the read document image in which the abnormality is generated (S109). Controller 311 performs warning processing to display an error/warning message on display 314 in order to inform the user of the abnormal stop in reading the document (S110). Then the processing is ended. When the current job is not the copy (NO in S108), controller 311 performs the warning processing to display the error/warning message on display 314 in order to inform the user of the abnormal stop in reading the document (S110). Then the processing is ended.

Figure 10:
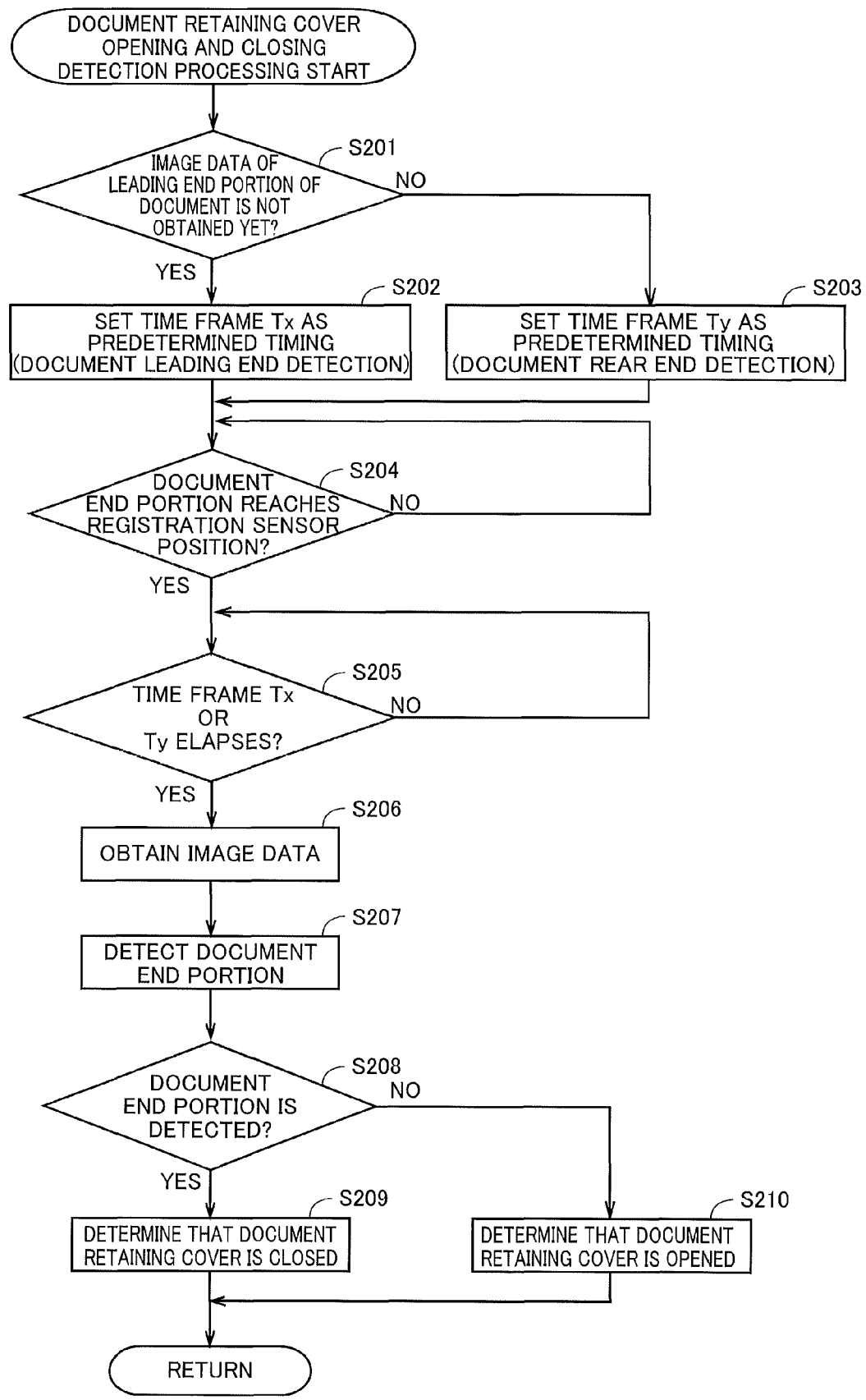
FIG. 10 is a view illustrating a detailed sub-routine for document retaining cover opening and closing detection processing in FIG. 9.

FIG. 10 is a view illustrating a detailed sub-routine for document retaining cover opening and closing detection processing in FIG. 9.

Referring to FIG. 10, in the document retaining cover opening and closing detection processing (S102), controller 311 determines whether the image data of leading end portion P1 of the document that is fed from document tray 251 and is not read yet is not obtained yet (whether edge detection processing is not performed yet to the document leading end) (S201). When it is determined that the image data of leading end portion P1 of the document is not obtained yet (YES in S201), the end portion of document 290a to be detected is leading end portion P1. In this case, controller 311 sets time frame Tx as the time frame (predetermined timing in which the end portion of the document is read) until image sensor 207 starts the image capturing since the output signal of registration sensor 256 changes (S202), and controller 311 goes to step S204. On the other hand, when it is determined that the image data of leading end portion P1 of the document is already obtained (NO in S201), the end portion of document 290a to be detected is rear end portion P2. At this point, controller 311 sets time frame Ty as the time frame (predetermined timing in which the end portion of the document is read) until image sensor 207 captures the image data of the rear end portion P2, since the output signal of registration sensor 256 changes (S203), and controller 311 goes to step S204.

In step S204, controller 311 determines whether end portion (leading end portion P1 or rear end portion P2) of document 290a reaches the position of registration sensor 256 based on the output signal change of registration sensor 256 (S204). When it is determined that the end portion of document 290a reaches the position of registration sensor 256 (YES in S204), controller 311 determines whether the predetermined timing elapses (whether time frame Tx or time frame Ty elapses since the end portion of document 290a reaches the position of registration sensor 256) (S205). When it is determined that the predetermined timing elapses (YES in S205), controller 311 obtains the image data at time when the predetermined timing elapses, using image sensor 207 (S206). Controller 311 detects the end portion of document 290a based on the obtained image data (S207). Then controller 311 determines whether the end portion of document 290a is detected based on the obtained image data (S208). When it is determined that the end portion of document 290a is detected (YES in S208), controller 311 determines that document retaining cover 20 is in the closed state (S209), and controller 311 returns to the main routine. When it is determined that the end portion of document 290a is not detected (NO in S208), controller 311 determines that document retaining cover 20 is in the opened state (S210), and controller 311 returns to the main routine.

[Effect of Embodiment]

The digital multi function peripheral of the embodiment includes: the IR module that reads the document image at the predetermined position to obtain the image data; the document retaining cover that sends the document from the plural documents one by one to convey the document to the read position; the registration sensor that detects the end portion in the sub-scanning direction of the document conveyed in the document retaining cover; and the controller that detects the end portion of the document with respect to the image data obtained when the predetermined time frame elapses since the state of the registration sensor changes. The controller determines that the document retaining cover is opened when the end portion of the document is not detected.

According to the digital multi function peripheral of the embodiment, in reading the document image using the ADF, whether the end portion of the document exists is detected in the image data that is obtained in predetermined timing since the end portion in the sub-scanning direction of the document is detected by the registration sensor. When the end portion is not detected in the image data, the determination that the document retaining cover is in the opened state is made, and the determination that the document is in the abnormal conveyance state is made to avoid the output of the abnormal image. Accordingly, even in the scanner that does not include the document retaining cover opening and closing sensor for the cost reduction, in reading the document image using the ADF, the opening and closing state of the document retaining cover can be detected based on the image data obtained in reading the document image. As a result, the opening and closing state of the document retaining cover can accurately be detected.

In the embodiment, both the leading end portion and the rear end portion of the document are detected as the end portion in the sub-scanning direction of the document, and the determination that the document retaining cover is opened is made when at least one of the leading end portion and the rear end portion of the document is not detected. Therefore, the opening and closing state of the document retaining cover can more correctly be determined based on the images of the leading end portion and the rear end portion of the document.

In the embodiment, when the controller determines that the document retaining cover is in the opened state while the ADF conveys the document, the document conveyance performed by the ADF is stopped to give a warning to the operator.

In the embodiment, when the controller determines that the document retaining cover is in the opened state while the ADF conveys the document, and when the operating function is the copy function, the control to output the read image data to the sheet is stopped. Therefore, the waste of sheets can be prevented.

[Other]

In the embodiment, the opening and closing state of the document retaining cover is determined based on the states of both the leading end portion and the rear end portion in the document image as the end portion in the sub-scanning direction of the document. However, in the invention, the opening and closing state of the document retaining cover may be determined based on the state of the end portion of the document extended in the direction perpendicular to the conveyance direction. Alternatively, the opening and closing state of the document retaining cover may be determined based on only one of the leading end portion and the rear end portion in the document image.

The image forming apparatus of the invention may be a facsimile machine, a copying machine, and the like in addition to the digital multi function peripheral. The document reading device of the invention may be singularly used as a scanner device in addition to the case in which the document reading device is incorporated in the image forming apparatus.

The pieces of processing of the embodiment may be performed by software or a hardware circuit. A program for performing the pieces of processing of the embodiment can be provided, or the program may be provided to the user while recording in recording mediums such as a CD-ROM, a flexible disk, a hard disk, a ROM, a RAM, and a memory card. The program is executed by computers such as a CPU. The program may be downloaded to the apparatus through communication lines such as the Internet.

According to the document reading device, the image forming apparatus, the document reading device controlling method, and the control program for the document reading device of the embodiment, the opening and closing state of the conveyance unit for conveying the document can accurately be detected.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A document reading device comprising:
 a reader for reading an image in a read position;
 a conveyance unit for being able to change from an opened state in which said reader is opened to a closed state in which said reader is closed, and for conveying a document to said read position when said reader is closed;
 a detector for detecting an end portion of the document, wherein the end portion extends in a direction perpendicular to a conveyance direction in which the document is conveyed by said conveyance unit; and
 a determination unit for determining the opened state and the closed state of said conveyance unit based on a state of an image at the end portion of said document read by said reader when a predetermined time elapses since a detection state of said detector changes.

2. The document reading device according to claim 1, wherein said determination unit includes:
 a first determination unit for determining the opened state and the closed state of said conveyance unit based on a state of the image at an end portion on a downstream side in the conveyance direction of said document read by said reader at a time when a first time elapses since the detection state of said detector changes from a document undetected state to a document detected state; and
 a second determination unit for determining the opened state and the closed state of said conveyance unit based on a state of the image at an end portion on an upstream side in the conveyance direction of said document read by said reader at a time when a second time frame elapses since the detection state of said detector changes from the document detected state to the document undetected state.

3. The document reading device according to claim 1, wherein said conveyance unit stops conveyance of said document when said determination unit determines that said conveyance unit is in the opened state.

4. The document reading device according to claim 1, further comprising a warning unit for giving a warning to an operator who performs a job relating to image reading of said document when said determination unit determines that said conveyance unit is in the opened state.

5. The document reading device according to claim 1, wherein said determination unit determines that said conveyance unit is in the opened state when said end portion of said document is not detected from the image read by said reader.

6. The document reading device according to claim 1, wherein said predetermined time frame is lower than a time frame from a time when said detection state of said detector changes to a time when said document reaches said read position.

7. An image forming apparatus comprising:
the document reading device according to claim 1; and
an image forming unit for forming an image based on said image read by said document reading device.

8. The image forming apparatus according to claim 7, wherein said image forming unit stops output of the image read by said reader to a sheet, when said determination unit determines that said conveyance unit is in the opened state, and when a currently performed job is a copy job.

9. A method for controlling a document reading device including a reader for reading an image in a read position and a conveyance unit for being able to change from an opened state in which said reader is opened to a closed state in which said reader is closed, and for conveying a document to said read position when said reader is closed,
said document reading device controlling method comprising the steps of:
detecting an end portion of said document, wherein the end portion extends in a direction perpendicular to a conveyance direction in which the document is conveyed by said conveyance unit; and
determining said opened state and said closed state of said conveyance unit based on a state of the image at said end portion of said document read by said reader at a time when a predetermined time frame elapses since a detection state in said detecting step changes.

10. The method for controlling the document reading device according to claim 9, wherein said determining step includes the steps of:
determining the opened state and the closed state of said conveyance unit based on a state of the image at an end portion on a downstream side in the conveyance direction of said document read by said reader at a time when a first time elapses since the detection state in said detecting step changes from a document undetected state to a document detected state; and
determining said opened state and said closed state of said conveyance unit based on a state of the image at an end portion on an upstream side in the conveyance direction of said document read by said reader at a time when a second time frame elapses since the detection state in said detecting step changes from the document detected state to the document undetected state.

11. The method for controlling the document reading device according to claim 9, wherein said conveyance unit stops conveyance of said document when a determination that said conveyance unit is in the opened state is made in said determining step.

12. The method for controlling the document reading device according to claim 9, further comprising the step of giving a warning to an operator who performs a job relating to image read of the document when a determination that said conveyance unit is in the opened state is made in said determining step.

13. The method for controlling the document reading device according to claim 9, wherein a determination that said conveyance unit is in the opened state is made in said determining step when the end portion of said document is not detected from the image read by said reader.

14. The method for controlling the document reading device according to claim 9, wherein said predetermined time frame is lower than a time frame from a time when said detection state in said detecting step changes to a time when said document reaches said read position.

15. The method for controlling the document reading device according to claim 9, further comprising the step of forming an image based on the image read by said reader.

16. The method for controlling the document reading device according to claim 9, wherein output of the image read by said reader to a sheet is stopped in said image forming step, when a determination that said conveyance unit is in the opened state is made in said determining step, and when a currently performed job is a copy job.

17. A non-transitory computer readable medium storing a control program for a document reading device, said document reading device including a reader for reading an image in a read position and a conveyance unit for being able to change an opening and closing state between a state in which said reader is closed and a state in which said reader is opened and conveying a document to said read position when the reader is closed, said control program for said document reading device causing a computer to perform the steps of:
detecting an end portion of the document, wherein the end portion extends in a direction perpendicular to a conveyance direction in which the document is conveyed by said conveyance unit; and
determining said opened state and said closed state of said conveyance unit based on a state of the image at the end portion of said document read by said reader at a time when a predetermined time frame elapses since a detection state in said detecting step changes.

18. The computer readable medium according to claim 17, wherein said determining step includes the steps of:
determining the opened state and the closed state of said conveyance unit based on a state of the image at an end portion on a downstream side in the conveyance direction of said document read by said reader at a time when a first time elapses since the detection state in said detecting step changes from a document undetected state to a document detected state; and
determining the opened state and said closed state of said conveyance unit based on a state of the image at an end portion on an upstream side in the conveyance direction of said document read by said reader at a time when a second time frame elapses since the detection state in said detecting step changes from the document detected state to the document undetected state.

19. The computer readable medium according to claim 17, wherein said conveyance unit stops conveyance of said document when a determination that said conveyance unit is in the opened state is made in said determining step.

20. The computer readable medium according to claim 17, further comprising the step of giving a warning to an operator who performs a job relating to image read of said document when a determination that said conveyance unit is in the opened state is made in said determining step.

21. The computer readable medium according to claim 17, wherein a determination that said conveyance unit is in the opened state is made in said determining step when said end portion of said document is not detected from the image read by said reader.

22. The computer readable medium according to claim 17, wherein said predetermined time frame is lower than a time frame from a time when said detection state in said detecting step changes to a time when said document reaches said read position.

23. The computer readable medium according to claim 17, further comprising the step of forming an image based on the image read by said reader.

24. The computer readable medium according to claim 17, wherein output of the image read by said reader to a sheet is stopped in said image forming step, when a determination that said conveyance unit is in the opened state is made in said determining step, and when a currently performed job is a copy job.

* * * * *